(12) United States Patent
Park

(10) Patent No.: US 9,331,326 B2
(45) Date of Patent: May 3, 2016

(54) BATTERY PACK

(71) Applicant: SAMSUNG SDI CO., LTD., Yongin-si, Gyeonggi-do (KR)

(72) Inventor: Han-Kyu Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 331 days.

(21) Appl. No.: 13/789,418

(22) Filed: Mar. 7, 2013

(65) Prior Publication Data

US 2014/0017519 A1      Jan. 16, 2014

(30) Foreign Application Priority Data

Jul. 16, 2012   (KR) .................. 10-2012-0077140

(51) Int. Cl.
| | | |
|---|---|---|
| *H01M 2/10* | (2006.01) | |
| *H01M 2/04* | (2006.01) | |
| *H01M 10/42* | (2006.01) | |
| *H01M 2/34* | (2006.01) | |

(52) U.S. Cl.
CPC ................ *H01M 2/34* (2013.01); *H01M 2/105* (2013.01); *H01M 10/4257* (2013.01); *H01M 2220/30* (2013.01)

(58) Field of Classification Search
CPC ..... H01M 2/02–2/0247; H01M 2/0257–2/065; H01M 2/10–2/1066; H01M 2/20–2/28; H01M 10/42; H01M 10/4207; H01M 10/425–10/4264
See application file for complete search history.

(56) References Cited

U.S. PATENT DOCUMENTS

| | | | | |
|---|---|---|---|---|
| 3,712,695 | A * | 1/1973 | Kaye .................. | H01M 2/1038 206/37 |
| 4,276,358 | A * | 6/1981 | Henson ............... | H01M 2/1005 429/163 |
| 2001/0043051 | A1* | 11/2001 | Namura .............. | H01M 2/105 320/112 |
| 2004/0180260 | A1* | 9/2004 | Somatomo ......... | H01M 2/0426 429/174 |
| 2005/0031945 | A1* | 2/2005 | Morita et al. ................. | 429/158 |
| 2005/0250005 | A1* | 11/2005 | Bacon ................ | H01M 2/0207 429/152 |
| 2009/0214936 | A1* | 8/2009 | Yang et al. ....................... | 429/61 |
| 2010/0047676 | A1* | 2/2010 | Park et al. ....................... | 429/93 |
| 2010/0092859 | A1* | 4/2010 | Kim et al. ..................... | 429/178 |
| 2011/0250491 | A1* | 10/2011 | Kim .................... | H01M 2/0207 429/176 |
| 2012/0127676 | A1* | 5/2012 | Warmuth ............ | H01M 2/202 361/748 |

FOREIGN PATENT DOCUMENTS

| | | |
|---|---|---|
| EP | 1 760 804 A1 | 3/2007 |
| KR | 10-2004-0013123 A | 2/2004 |
| KR | 10-2007-0025392 A | 3/2007 |

* cited by examiner

*Primary Examiner* — Jonathan Crepeau
*Assistant Examiner* — Jacob Buchanan
(74) *Attorney, Agent, or Firm* — Lewis Roca Rothgerber Christie LLP

(57) ABSTRACT

A battery pack includes a plurality of battery cells including an electrode portion; a holder case accommodating the plurality of battery cells; and a printed circuit module (PCM) mounted to an outer surface of the holder case, the holder case including a fastening portion fixing the PCM to the holder case, the fastening portion being at a region of the holder case corresponding to an edge portion of the PCM.

10 Claims, 4 Drawing Sheets

BATTERY PACK

CROSS-REFERENCE TO RELATED APPLICATION

This application claims priority to and the benefit of Korean Patent Application No. 10-2012-0077140, filed on Jul. 16, 2012 in the Korean Intellectual Property Office, the entire content of which is incorporated herein by reference.

BACKGROUND

1. Field

Aspects of embodiments of the present invention relate to a battery pack.

2. Description of the Related Art

In general, a battery pack having a plurality of battery cells connected in parallel and/or in series may be used in a device such as a notebook computer or an electric vehicle or hybrid vehicle. Adjacent battery cells may be connected to the plurality of battery cells by a connection tab, and the plurality of battery cells may be mounted in a holder case.

SUMMARY

According to an aspect of embodiments of the present invention, in a battery pack, a printed circuit module (PCM) may be fixed to an outside of a holder case surrounding battery cells by a hook-shaped fastening structure.

According to an embodiment of the present invention, a battery pack includes: a plurality of battery cells including an electrode portion; a holder case accommodating the plurality of battery cells; and a printed circuit module (PCM) mounted to an outer surface of the holder case, the holder case including a fastening portion fixing the PCM to the holder case, the fastening portion being at a region of the holder case corresponding to an edge portion of the PCM.

The fastening portion may be hook-shaped.

The PCM may include a groove-shaped accommodating portion accommodating the fastening portion.

The fastening portion may include a material having elasticity.

The fastening portion may include at least one of polyimide, polypropylene, polyethylene, or polystyrene.

The fastening portion may be integrally formed with the holder case.

The holder case may expose the electrode portion of the plurality of battery cells, and surround side surfaces of battery cells of the plurality of battery cells.

The battery pack may further include a connection tab at the electrode portion, and an insulating member on the connection tab. The battery pack may further include a lead line connected between the connection tab and the PCM.

Battery cells of the plurality of battery cells may be connected in parallel in one direction.

An inner surface of the holder case may have a shape corresponding to a shape of the plurality of battery cells.

The PCM may include a main PCM and a sub-PCM, and the fastening portion may include a plurality of fastening portions fixing the main PCM and the sub-PCM to the holder case.

According to an aspect of embodiments of the present invention, the PCM is fixed to the outside of the holder case surrounding the battery cells by a hook-shaped fastening structure, such that a cost of components may be reduced by omitting screw components, and a manufacturability may be improved by simplifying operations. Further, a quality failure due to an inexperienced operator may be prevented or substantially prevented, thereby improving the quality of the battery pack.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

Figure 1:
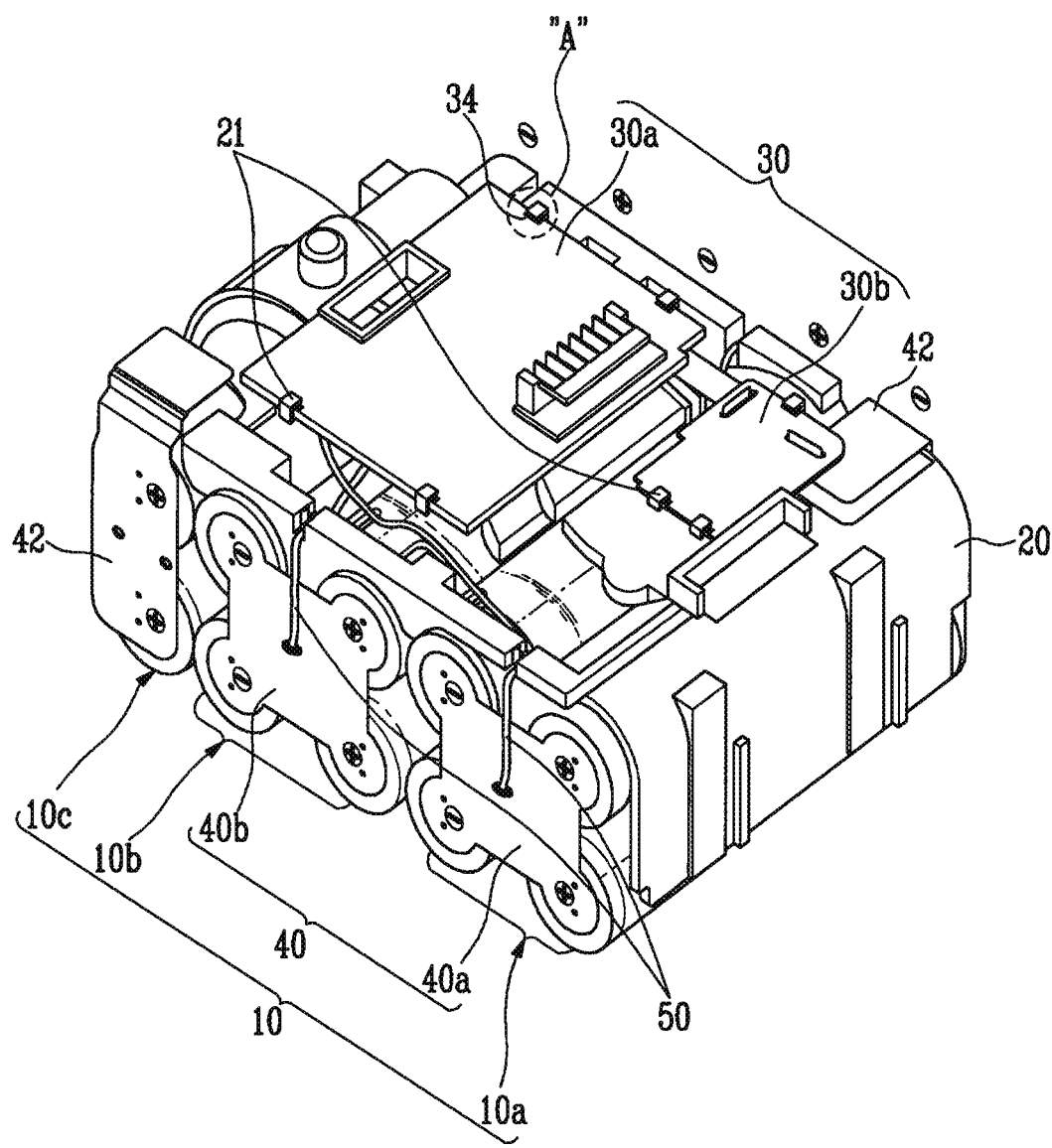
FIG. 1 is a front perspective view of a battery pack including a plurality of battery cells mounted in a holder case, according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or indirectly on the another element with one or more intervening elements interposed therebetween. Also, when an element is referred to as being "connected to" another element, it may be directly connected to the another element or indirectly connected to the another element with one or more intervening elements connected therebetween. Like reference numerals refer to like elements. Also, in the drawings, the thickness or size of components or layers may be exaggerated for clarity and may not necessarily be drawn to scale.

Figure 2:
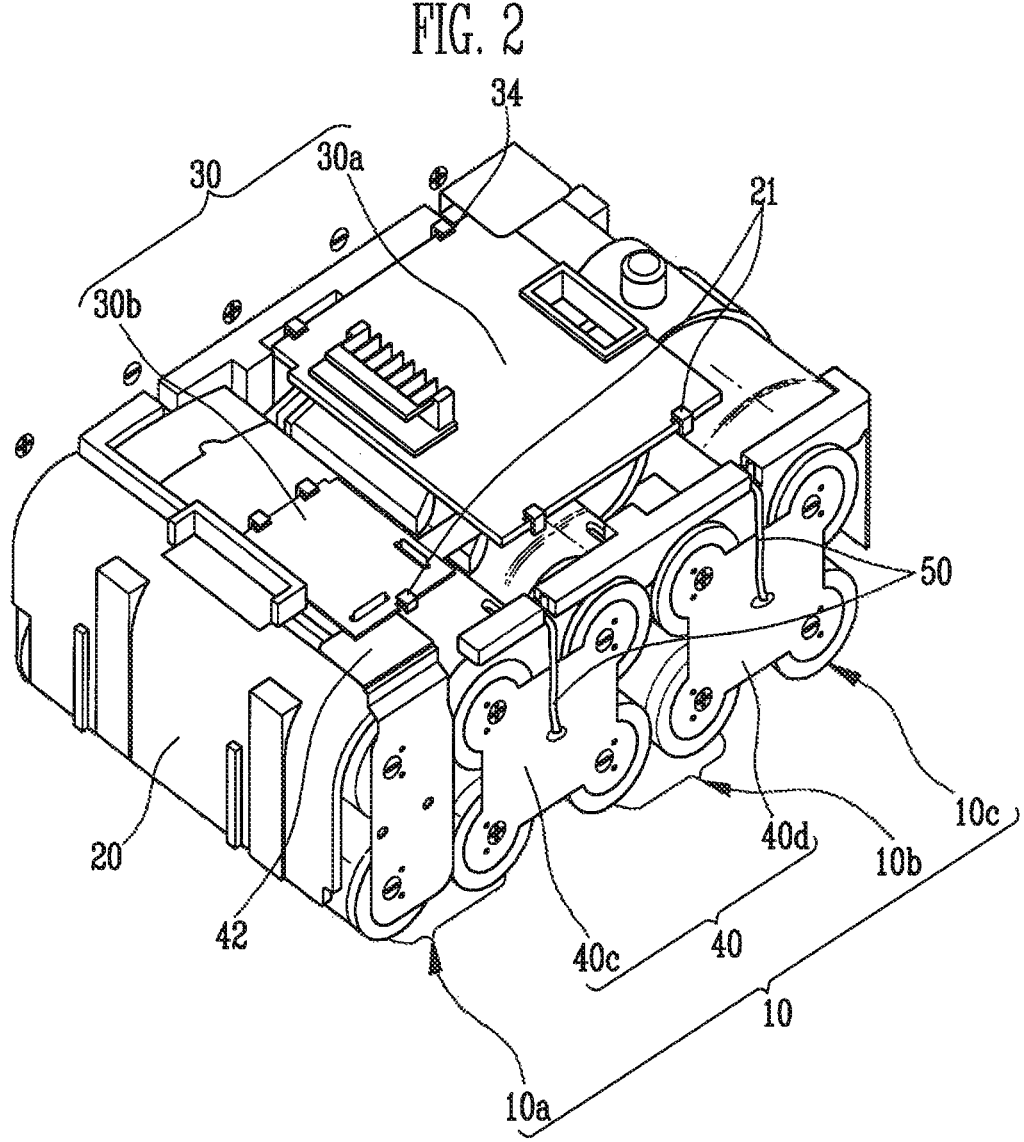
FIG. 2 is a rear perspective view of the battery pack including the plurality of battery cells mounted in the holder case of FIG. 1.

FIG. 1 is a front perspective view of a battery pack including a plurality of battery cells mounted in a holder case, according to an embodiment of the present invention. FIG. 2 is a rear perspective view of the battery pack including the plurality of battery cells mounted in the holder case of FIG. 1.

Referring to FIGS. 1 and 2, a battery pack according to an embodiment of the present invention includes an electrode portion, and includes a plurality of battery cells 10 disposed in parallel in one direction, a holder case 20 that accommodates the plurality of battery cells 10, and a printed circuit module (PCM) 30 mounted to an outer surface of the holder case 20. At least one fastening portion 21 that fixes the PCM 30 to the holder case 20 is provided at one or more regions of the holder case 20 corresponding to at least one edge portion of the PCM 30.

In one embodiment, the fastening portion 21 is formed in the shape of a hook, so as to fix a region of the edge portion of the PCM 30. Further, in one embodiment, a groove-shaped accommodating portion 34 that accommodates the fastening portion 21 is formed on the PCM 30 corresponding to the fastening portion 21. Accordingly, the fastening portion 21 may be firmly fastened to the accommodating portion 34 while being accommodated in the accommodating portion 34. The PCM 30, in one embodiment, includes a main PCM 30a and a sub-PCM 30b.

The fastening portion 21, in one embodiment, is formed of an insulation material having elasticity. In one embodiment, for example, the fastening portion 21 may be formed of at least one of polyimide, polypropylene, polyethylene, or polystyrene. In one embodiment, when the PCM 30 is mounted to the outer surface of the holder case 20, the hook-shaped fastening portion 21 is pulled to the outside of the PCM 30, and when the PCM 30 is mounted, the fastening portion 21 is returned to its original position. Accordingly, the fastening portion 21 is accommodated in the accommodating portion 34, and thus the PCM 30 can be easily mounted to the outer surface of the holder case 20. In one embodiment, the fastening portion 21 may be integrally formed with the holder case 20.

In one embodiment, each of the plurality of battery cells 10 may be a cylindrical rechargeable lithium ion battery. The battery cells 10 according to one embodiment include battery cells 10a, 10b, and 10c, and are arranged into a five-series and two-parallel structure (5S2P). That is, a group may be formed by connecting two battery cells 10 in parallel, and five groups may be formed in series by a connection tab 40. including connection tabs 40a, 40b, 40c, and 40d. The connection tab 40 is formed of a conductive material, such as copper, so as to electrically connect the groups of the plurality of battery cells 10.

The connection relationship between the groups of the plurality of battery cells 10 is described below in further detail with reference to FIG. 1. In each group of the battery cells 10, two battery cells 10 are connected in parallel. In the battery cells 10 connected in parallel, one end that is a first end portion has a first polarity and the other end that is a second end portion has a second polarity.

In FIG. 1, the first polarity of the battery cells 10 is electrically connected to the PCM 30 through a connection tab 42. In FIG. 2, the second polarity of the battery cells 10 is electrically connected in series to the first polarity of adjacent battery cells 10 through a connection tab 40d. Accordingly, the five groups of the battery cells 10 are connected in series, and the second polarity of the last battery cells 10 is electrically connected to the PCM 30 through the connection tab 42.

The five-series and two-parallel structure (5S2P) has been described in one embodiment; however, the present invention is not limited thereto. It will be apparent to those skilled in the art that various connection structures may be employed.

The holder case 20 according to an embodiment of the present invention may be formed to expose the electrode portion of the plurality of battery cells 10 and to surround at least one portion of the outer surfaces of the plurality of battery cells 10. An inner surface of the holder case 20 may have a shape to be matched with circumferential surfaces of the battery cells 10 (e.g., cylindrical battery cells). Accordingly, the battery cells 10 may be prevented or substantially prevented from being moved by an external impact.

Lead lines 50 for electrically connecting the plurality of battery cells 10 to the PCM 30 may be connected to the PCM 30. In one embodiment, the lead lines 50 are coated with a vinyl tube, or the like, and connect the plurality of battery cells 10 to the PCM 30. In one embodiment, the lead lines 50 may be monitoring lead lines to measure cell balancing. One side of the lead line 50 may be connected to the connection tab 40, and the other side of the lead line 50 may be connected to the PCM 30. The one side of the lead line 50 may be connected to the connection tab 40 through soldering, for example. It may be checked by the lead line 50 whether or not current smoothly flows in the plurality of battery cells 10.

Figure 3:
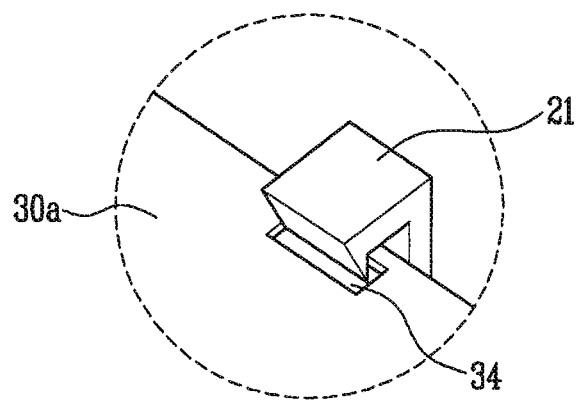
FIG. 3 is an enlarged view showing a region "A" of FIG. 1.

FIG. 3 is an enlarged view showing a region "A" of FIG. 1.

Referring to FIG. 3, the main PCM 30a is mounted to the outer surface of the holder case 20. The fastening portion 21 for fixing the main PCM 30a to the holder case 20 is formed on the outer surface of the holder case 20. The fastening portion 21, in one embodiment, is formed on the outer surface of the holder case 20, corresponding to an edge portion of the main PCM 30a. The fastening portion 21 may be formed in the shape of a hook, so as to fix one region of the edge portion of the main PCM 30a to the holder case 20. In one embodiment, the groove-shaped accommodating portion 34 that accommodates the hook-shaped fastening portion 21 may be formed in the main PCM 30a corresponding to the hook-shaped fastening portion 21.

In one embodiment, the fastening portion 21 is formed of a material having elasticity, such that after the main PCM 30a is mounted on the outer surface of the holder case 20, the fastening portion 21 may be accommodated in the accommodating portion 34.

A PCM of a conventional battery pack may typically be mounted to the holder case by a screw-fastening method. In this case, a cost for a separate component is added due to the screw-fastening method, and a component of the PCM may be broken due to a worker's operation or inexperience. Further, a short circuit may occur in the PCM, and a process may be added by using a jig for protecting the PCM.

According to embodiments of the present invention, the hook-shaped fastening portion 21 is formed on the outer surface of the holder case 20, such that the PCM 30 is fixed to the holder case 20. Thus, according to embodiments of the present invention, a manufacturing process of the battery pack is simplified and a quality of the battery pack may be improved.

Figure 4A:
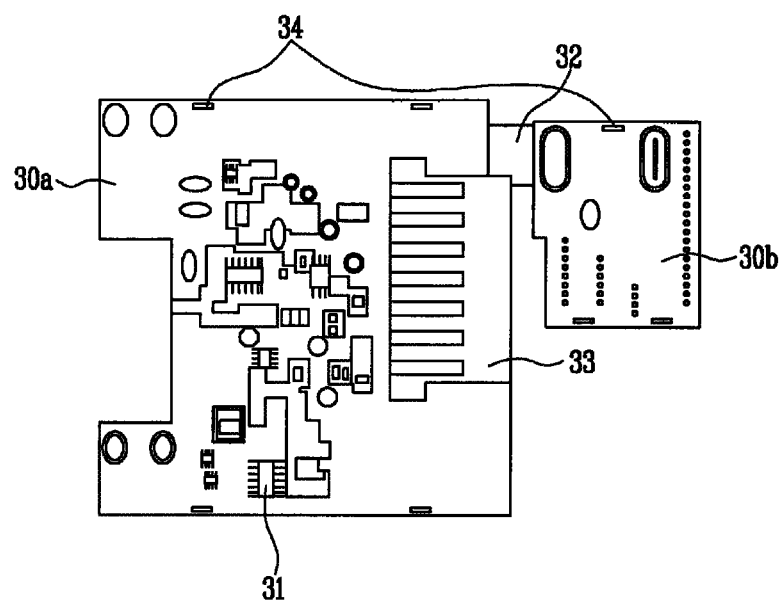
FIG. 4A is a top view of a printed circuit module (PCM) of a battery pack, according to an embodiment of the present invention.
Figure 4B:
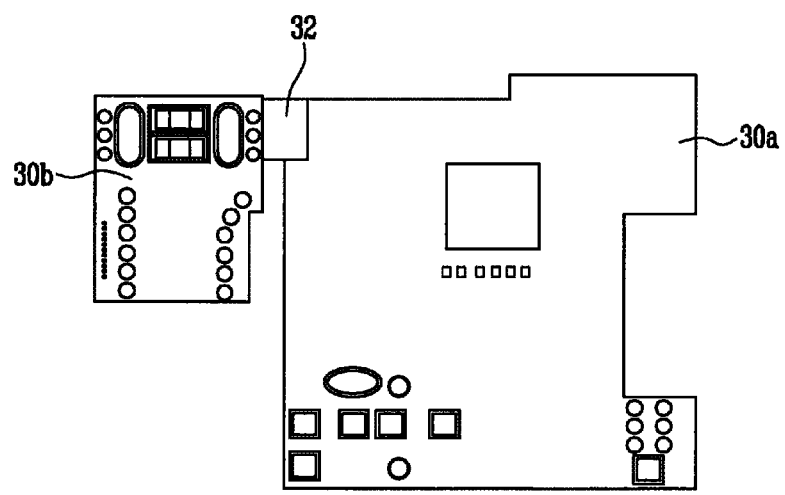
FIG. 4B is a bottom view of the PCM of FIG. 4A.

FIG. 4A is a top view of the PCM 30 according to an embodiment of the present invention. FIG. 4B is a bottom view of the PCM 30 according to an embodiment of the present invention.

Referring to FIGS. 4A and 4B, the main PCM 30a and the sub-PCM 30b are electrically connected by a connection member 32. A thermistor 33 and various kinds of circuit components 31 are mounted on top surfaces (i.e. surfaces exposed to the outside) of the main and sub-PCMs 30a and 30b. A region soldered to fix the circuit components 31 and the like exists on bottom surfaces (i.e. surfaces contacting the holder case 20) of the main and sub-PCMs 30a and 30b (see FIG. 1).

As such, the various circuit components 31 and the like are positioned at a narrow interval on the main and sub-PCMs 30a and 30b. Hence, a highly precise operation is required to fix the main and sub-PCMs 30a and 30b to the holder case 20 by screws.

According to embodiments of the present invention, the fastening portion 21 of the holder case 20 is fastened to be accommodated in the groove-shaped accommodating portion 34 of each of the main and sub-PC Ms 30a and 30b, such that the circuit components, and the like, mounted on the main and sub-PCMs 30a and 30b may be prevented or substantially prevented from being broken.

Figure 5:
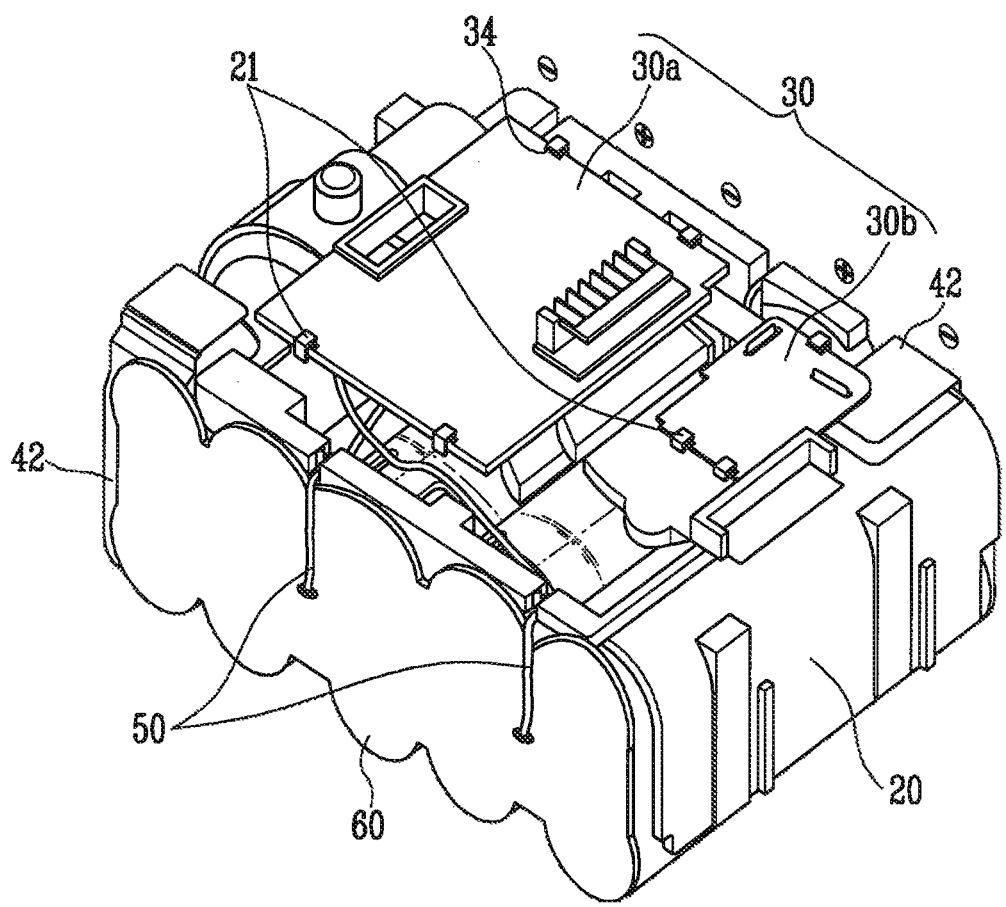
FIG. 5 is a perspective view of a battery pack including an insulating member, according to an embodiment of the present invention.

FIG. 5 is a perspective view of a battery pack including an insulating member, according to an embodiment of the present invention.

Referring to FIG. 5, according to an embodiment of the present invention, the battery pack includes an insulating member 60 to prevent or substantially prevent the connection tab 40 (see FIG. 1) and an exterior holder case (not shown)

that is an exterior material from coming in contact with each other. In one embodiment, the first and second polarities of the plurality of battery cells 10 are fixed to the connection tab 40 through welding, or the like. The insulating member 60, in one embodiment, is formed of a material having excellent heat resistance such that damage caused by heat generated when current flows in the connection tab 40 or the lead line 50 may be prevented or substantially prevented.

According to an embodiment of the present invention, the PCM 30 may be mounted on a top surface of the holder case 20. In the PCM 30, electronic components and the like are mounted, and a protection circuit and the like are configured. The PCM 30 may be fixed to the holder case 20 by the hook-shaped fastening portion 21 of the holder case 20.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a plurality of battery cells including an electrode portion;
   a holder case accommodating the plurality of battery cells; and
   a printed circuit module (PCM) mounted to an outer surface of the holder case,
   wherein the holder case comprises a fastening portion fixing the PCM to the holder case, the fastening portion being at a region of the holder case corresponding to an edge portion of the PCM,
   wherein the PCM comprises a main PCM and a sub-PCM, each mounted to the same outer surface of the holder case,
   wherein the PCM includes a groove-shaped accommodating, portion accommodating the fastening portion, the groove-shaped accommodating portion being spaced part from an edge of the PCM at the edge portion, and
   wherein the fastening portion is hook-shaped and is insertable into the groove-shaped accommodating portion in a direction toward the holder case.

2. The battery pack according to claim 1, wherein the fastening portion comprises a material having elasticity.

3. The battery pack according to claim 2, wherein the fastening portion comprises at least one of polyimide, polypropylene, polyethylene, or polystyrene.

4. The battery pack according to claim 1, wherein the fastening portion is integrally formed with the holder case.

5. The battery pack according to claim 1, wherein the holder case exposes the electrode portion of the plurality of battery cells, and surrounds side surfaces of battery cells of the plurality of battery cells.

6. The battery pack according to claim 1, further comprising a connection tab at the electrode portion, and an insulating member on the connection tab.

7. The battery pack according to claim 6, further comprising a lead line connected between the connection tab and the PCM.

8. The battery pack according to claim 1, wherein battery cells of the plurality of battery cells are connected in parallel in one direction.

9. The battery pack according to claim 1, wherein an inner surface of the holder case has a shape corresponding to a shape of the plurality of battery cells.

10. The battery pack according to claim 1, wherein the fastening portion comprises a plurality of fastening portions fixing the main PCM and the sub-PCM to the holder case.

* * * * *